Figure 1:
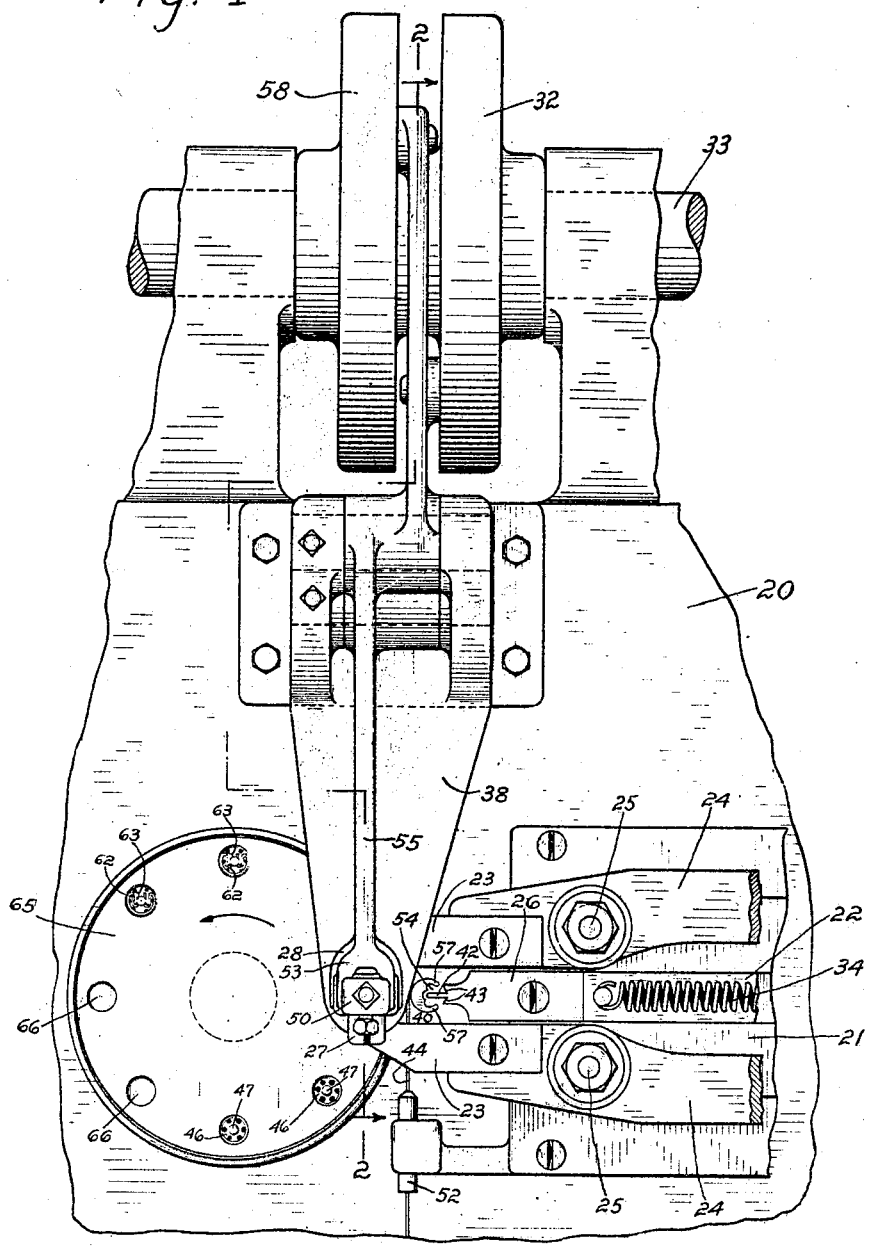

A. J. LEWIS.
SPRING ASSEMBLING MECHANISM FOR SNAP FASTENERS.
APPLICATION FILED JAN. 26, 1918.

1,271,330.

Patented July 2, 1918.
3 SHEETS—SHEET 1.

INVENTOR
Arthur J. Lewis
BY
A. M. Wooster
ATTORNEY

A. J. LEWIS.
SPRING ASSEMBLING MECHANISM FOR SNAP FASTENERS.
APPLICATION FILED JAN. 26, 1918.
1,271,330.
Patented July 2, 1918.
3 SHEETS—SHEET 2.
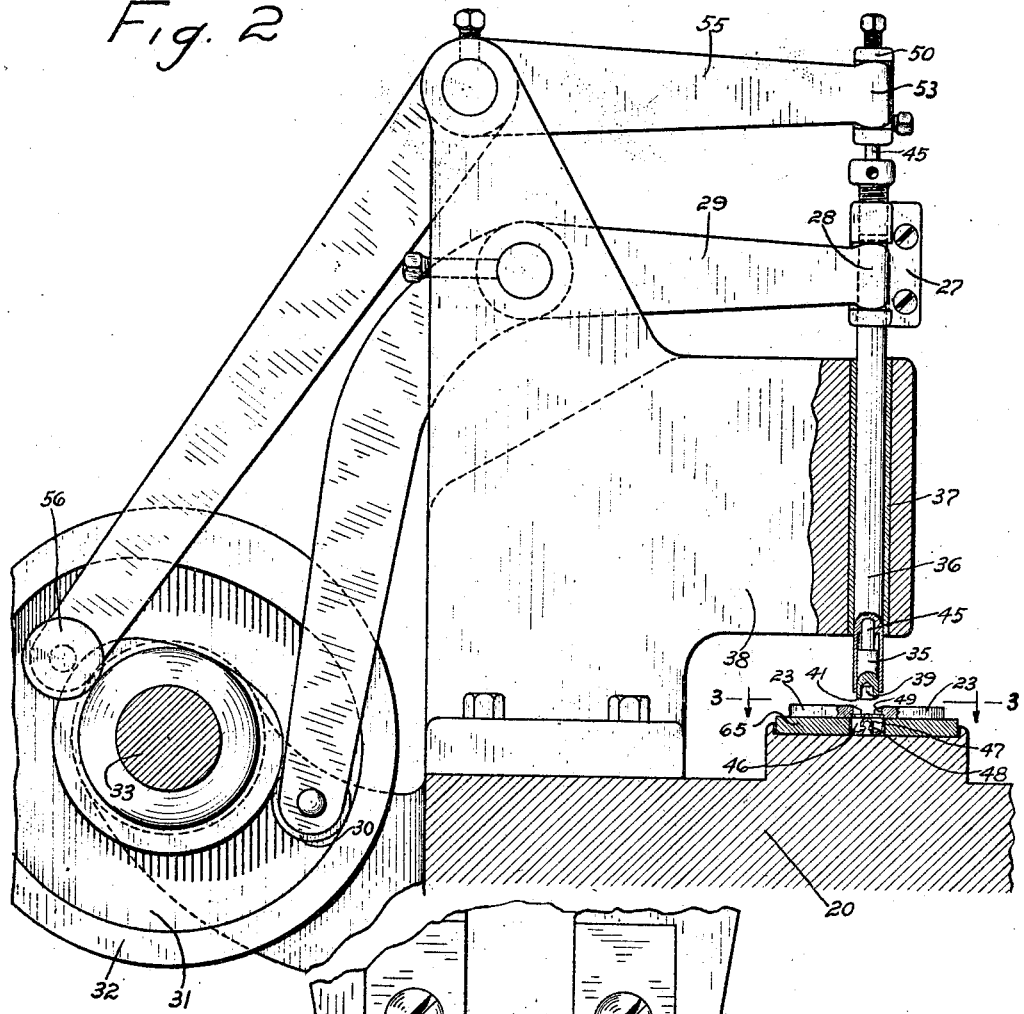
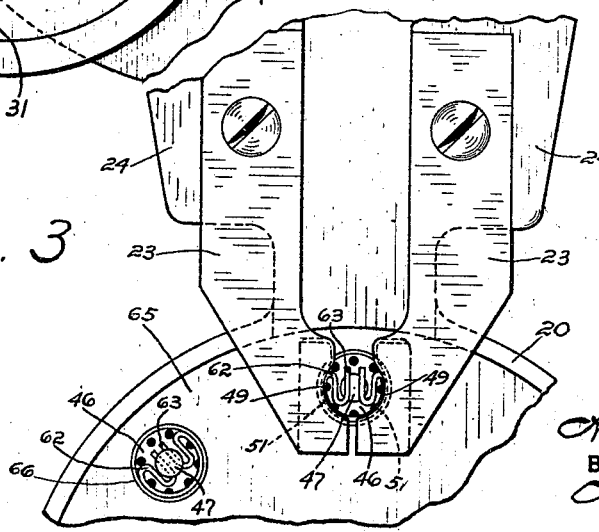
INVENTOR
Arthur J. Lewis
BY
ATTORNEY

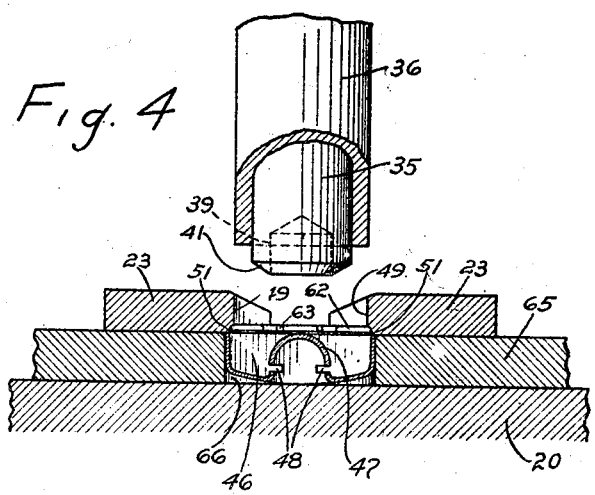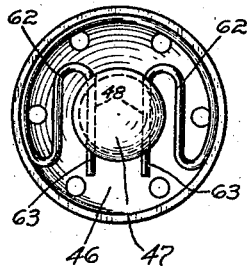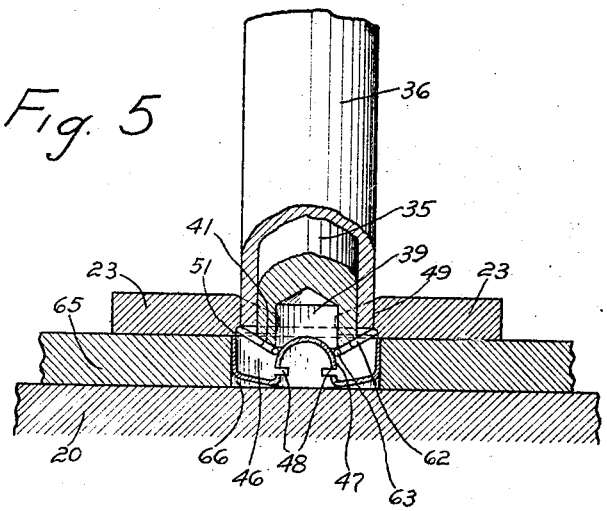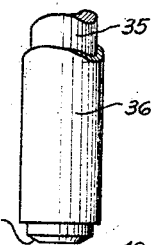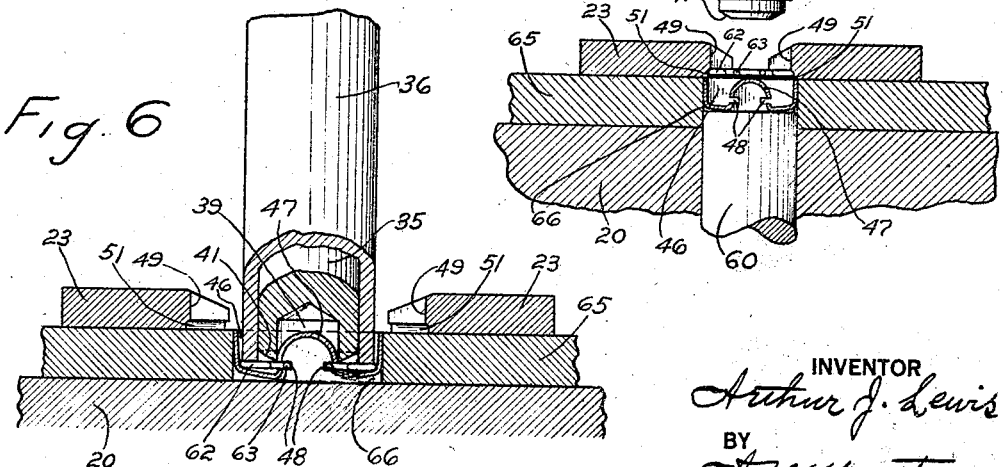

UNITED STATES PATENT OFFICE.

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT.

SPRING-ASSEMBLING MECHANISM FOR SNAP-FASTENERS.

1,271,330.   Specification of Letters Patent.   Patented July 2, 1918.

Application filed January 26, 1918. Serial No. 213,997.

*To all whom it may concern:*

Be it known that I, ARTHUR J. LEWIS, a citizen of the United States, residing at Stratford, county of Fairfield, State of Connecticut, have invented an Improvement in Spring-Assembling Mechanism for Snap-Fasteners, of which the following is a specification.

This invention relates to the manufacture of the socket members of snap fasteners, so called, the socket members of which are provided with wire springs of peculiar formation, which lock the shanks of the other members in engagement with the socket members, and the invention has for its object to provide quick operating and reliable automatic mechanism for assembling the springs in the socket members.

In the accompanying drawings forming a part of this specification,

Figure 1 is a plan view of so much of a spring forming and assembling machine as is necessary to illustrate the present invention, Fig. 2 a view partly in elevation as seen from the left in Fig. 1, and partly in section on the line indicated by 2—2 in Fig. 1, looking toward the right, Fig. 3 a plan view, on an enlarged scale, as seen from the point indicated by line 3—3 in Fig. 2, Figs. 4, 5 and 6 detail views, partly in elevation and partly in section, on a still larger scale, illustrating successive steps in the operation of assembling a spring in a socket member, Fig. 7 a greatly enlarged plan view of a socket member with the spring assembled therein, and Fig. 8 is a view corresponding with Fig. 4, and illustrating a slight modification to adapt the machine for assembling springs in relatively shallow socket members.

The forming mechanism of the present case corresponds with the forming mechanism of my pending application, Serial No. 113,358, filed August 5, 1916.

20 denotes, as in said application, the bed, 21 a slide, adapted to reciprocate longitudinally in ways in the bed, 22 a slide adapted to reciprocate longitudinally in ways in slide 21 and independently thereof, 23 jaws carried by levers 24 pivoted to slide 21, as at 25, 26 the forming punch which is carried by slide 22, and 34 a spring which causes retraction of slide 22. 40 denotes the form for springs which is reciprocated by mechanism not shown as specifically it forms no portion of the present invention. The operative portion of the forming punch comprises a tongue 42 having notches 43 on opposite sides thereof, which receive the ends of the wire spring blank, indicated by 44. The operative portions of the jaws are provided with half sockets 49 which together form a socket to receive the form in the spring forming operation. In the backs of the jaws and surrounding the half sockets and extending across the tops of the operative portions of the jaws are grooves 51 adapted to receive the wire spring blank. The wire is fed to the machine through a quill 52, each operation of the feeding mechanism supplying just the required length of wire to form a spring blank. The instant the feeding operation ceases, a cutter, not shown, coöperating with the forward end of the quill, cuts off the blank. Any ordinary or preferred form of feeding and cutting-off mechanism may be used. The external contour of the form is circular. Within this circular contour, the metal is milled out to form a longitudinal recess indicated by 54. At the base of the recess is a central rounded longitudinal groove, which is adapted to receive the tongue of the forming punch, and on opposite sides of said groove are other rounded grooves into which the wire of the spring blank is pressed by the forming punch. The sides of the form comprise arms 57 which are rounded at their ends and incline toward each other.

The object of the mechanism of the present invention is to remove the formed springs from the jaws and deposit them in the fastener members. These members are placed either by hand or mechanically in holes 66 in a rotating disk indicated by 65. The mechanism for producing rotation of the disk is not shown as specifically it forms no portion of the present invention. Each spring blank is pressed about the form by the jaws and the ends pushed inward by the forming punch. After a spring is formed the forming punch and the form are both withdrawn leaving the spring in the jaws, which move forward and carry the spring to the assembling position that is over one of the sockets in the disk.

The shape of the fastener members and the springs will be readily understood from Fig. 7 and the accompanying views. The fastener members are blanked out and formed from sheet metal, and comprise a cup 46 having a central hollow stud 47 extending upward from the bottom and provided with slots 48 in opposite sides thereof. The springs are formed by bending spring blanks 44 to partly circular form and then curving and re-curving the ends of the blanks to form loops 62 and straight ends 63, which in the assembled position engage the slots in the studs as clearly shown in Fig. 7.

The assembling operation is performed by inner and outer plungers, indicated respectively by 35 and 36, the inner plunger being adapted to slide in the outer plunger and independently thereof, and the outer plunger being adapted to slide in a sleeve 37 which is seated in a bracket 38 bolted to the bed.

At the upper end of the outer plunger is an adjustable clamping block 27 which is engaged by a yoke 28 at the end of a bell-crank lever 29 which has its fulcrum in the bracket. At the other end of bell-crank lever 29 is a roller 30 which engages a cam groove 31 in a disk 32 carried by driving shaft 33. The inner plunger is provided with a shank 45 which extends upward through the outer plunger and is provided at its upper end with an adjustable block 50 which is engaged by a yoke 53 on a bell-crank lever 55 which has its fulcrum in the bracket. At the other end of bell-crank lever 55 is a roller 56 which engages a cam groove, not shown, in a disk 58 on the driving shaft. These cam grooves are plotted to produce the movements of the plungers which I will now describe.

Fig. 4 shows the plungers in the normal or inoperative position. From this position the inner plunger will move downward until it reaches the position shown in Fig. 6. Fig. 5 shows an intermediate position of the plungers. It will be noted that the end of the inner plunger is provided with a hole 39 which receives the stud of the fastener member and that it is also provided with an outward bevel or chamfer indicated by 41. Starting with the spring in the position shown in Fig. 4 the chamfer of the inner plunger will engage the ends and loops of the spring and tilt them downward and cause the ends to separate as they are pressed over the stud, as clearly shown in Fig. 5. The downward movement of the inner plunger will continue until the ends of the spring have been carried into alinement with the slots in the stud, into which the resilience of the spring will carry them. As soon as the ends of the spring have engaged the slots, the inner plunger will stop moving and the outer plunger will move downward until it has reached the position shown in Fig. 6, when the spring will be seated in the base of the socket. The plungers then move upward to the position shown in Fig. 4, the jaws and form return to the spring forming position and the disk moves forward and places another fastener member in position to receive a spring. The special manner in which the socket members with springs assembled therein are removed from the disk is unimportant so far as the present invention is concerned.

The form illustrated in Fig. 8 differs only in that provision is made for assembling springs in socket members of varying heights. It will of course be obvious that the tops of the cups of the fastener members must lie flush with the upper surface of the disk.

In order to enable me to assemble springs in cups of different heights, I provide a plunger 60 which moves vertically in the bed and is adapted to pass into the holes 66 in the disk. This plunger is timed to operate in unison with the other mechanism, so that when a hole with a fastener member therein has reached the assembling position, the plunger will rise, pass into the hole and raise the fastener member therein just sufficiently to place the upper edge of the cup flush with the surface of the disk. When the assembling operation is completed, plunger 60 will drop down below the disk. When the height of the fastener members being operated upon corresponds with the thickness of the disk, plunger 60 is rendered inoperative, the upper face thereof being set flush with the surface of the bed.

Having thus described my invention, I claim:

1. Mechanism of the character described, comprising spring holding means, member holding means adapted to register therewith, inner and outer plungers, means for moving the inner plunger to partly seat the spring in the member, and means for moving the outer plunger to complete the assembling operation.

2. Mechanism of the character described, comprising spring holding jaws adapted to be moved into assembling position, member holding means adapted to register with the jaws, inner and outer plungers, means for causing the inner plunger to remove the spring from the jaws and partly seat it in the member, and means for causing the outer plunger to make a subsequent movement to complete the assembling operation.

3. Mechanism of the character described, comprising spring holding means, a rotating disk having member receiving holes adapted to register with the spring holding means, inner and outer plungers, means for moving the inner plunger to partly seat a spring in the member and means for moving the outer plunger to complete the assembling operation.

4. Mechanism of the character described, comprising spring holding means, a rotating disk having member receiving holes adapted to register with the spring holding means, means for raising members in the holes, for the purpose set forth, inner and outer plungers, means for causing the inner plunger to partly seat a spring in the member and means for causing the outer plunger to complete the assembling operation.

5. Mechanism of the character described, comprising spring holding means, a rotating disk having member receiving holes adapted to register with the spring holding means, a bed over which the disk moves, a plunger in the bed adapted to register with a hole in operative position, to raise the member therein, inner and outer plungers, means for moving the inner plunger to partly seat a spring in the member and the outer plunger to complete the assembling operation.

6. Mechanism for assembling springs in members which comprise a cup and a central stud with slots in opposite sides thereof, consisting of spring holding means, member holding means adapted to register therewith, an inner plunger having a hole in its end to receive the stud, and a chamfer, an outer plunger, means for moving the inner plunger downward, the chamfer acting to separate the ends of the spring and press them over the stud into position to enter the slots, and means for moving the outer plunger downward to seat the spring in the cup.

7. Mechanism for assembling springs in members which comprise a cup and a central stud with slots in opposite sides thereof, consisting of spring holding jaws adapted to be moved into assembling position, member holding means adapted to register with the jaws, an inner plunger having a hole in its end to receive the stud, and a chamfer, an outer plunger, means for moving the inner plunger downward, the chamfer acting to separate the ends of the spring and press them over the stud into position to enter the slots, and means for moving the outer plunger to seat the spring in the cup.

8. Mechanism for assembling springs in members which comprise a cup and a central stud with slots in opposite sides thereof, consisting of spring holding means, a rotating disk having member receiving holes adapted to register with the spring holding means, an inner plunger having a hole in its end to receive the stud, and a chamfer, an outer plunger, means for moving the inner plunger downward, the chamfer acting to separate the ends of the spring and press them over the stud into position to enter the slots, and means for moving the outer plunger to seat the spring in the cup.

9. Mechanism for assembling springs in members which comprise a cup and a central stud with slots in opposite sides thereof, consisting of spring holding means, a rotating disk having member receiving holes adapted to register with the spring holding means, a bed over which the disk moves, a plunger in the bed adapted to register with the hole in operative position, to raise a member therein, an inner plunger having a hole in its end to receive the stud, and a chamfer, an outer plunger, means for moving the inner plunger downward, the chamfer acting to separate the ends of the spring and press them over the stud into position to enter the slots, and means for moving the outer plunger to seat the spring in the cup.

10. Mechanism for assembling springs in members which comprise a cup and a central stud with slots in opposite sides thereof, consisting of spring holding means, a rotating disk having member receiving holes adapted to register with the spring holding means, means for raising members in the holes, for the purpose set forth, an inner plunger having a hole in its end to receive the stud, and a chamfer, an outer plunger, means for moving the inner plunger downward, the chamfer acting to separate the ends of the spring and press them over the stud into position to enter the slots, and means for moving the outer plunger to seat the spring in the cup.

11. Mechanism of the character described, comprising jaws which place the springs in position to be operated upon, means for placing the members in the receiving position, inner and outer plungers, and means for actuating said plungers independently to seat springs in members by successive operations.

In testimony whereof I affix my signature.

ARTHUR J. LEWIS.